Jan. 13, 1953  F. J. DITTER  2,625,350
VANE CONTROLLED STABILIZING RIGGING
FOR AIRCRAFT LANDING SKIDS
Filed Oct. 10, 1947  2 SHEETS—SHEET 1
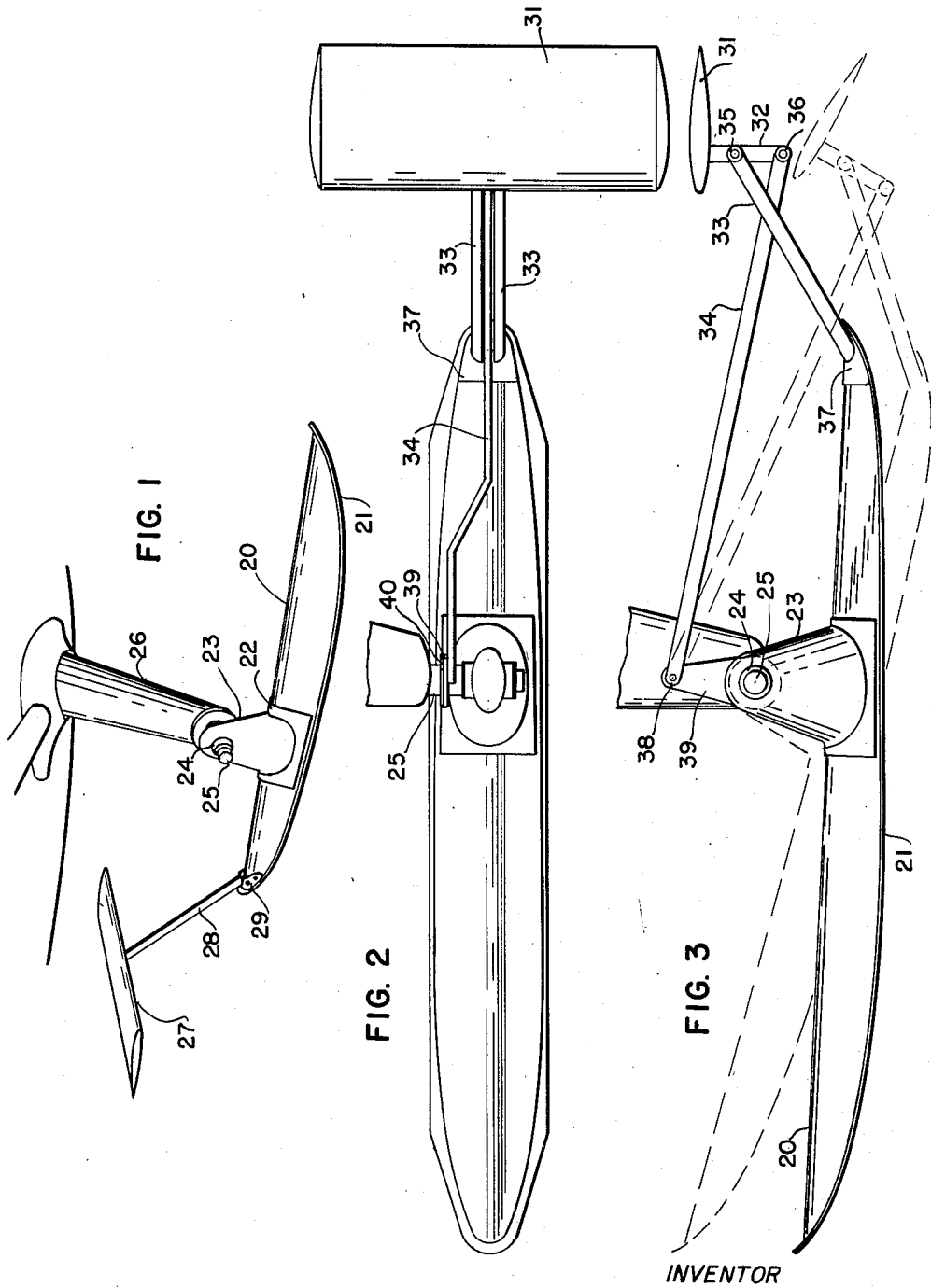
INVENTOR
FRANCIS J. DITTER
BY Anthony A. Juettner
ATTY.

Jan. 13, 1953 F. J. DITTER 2,625,350
VANE CONTROLLED STABILIZING RIGGING
FOR AIRCRAFT LANDING SKIDS
Filed Oct. 10, 1947 2 SHEETS—SHEET 2
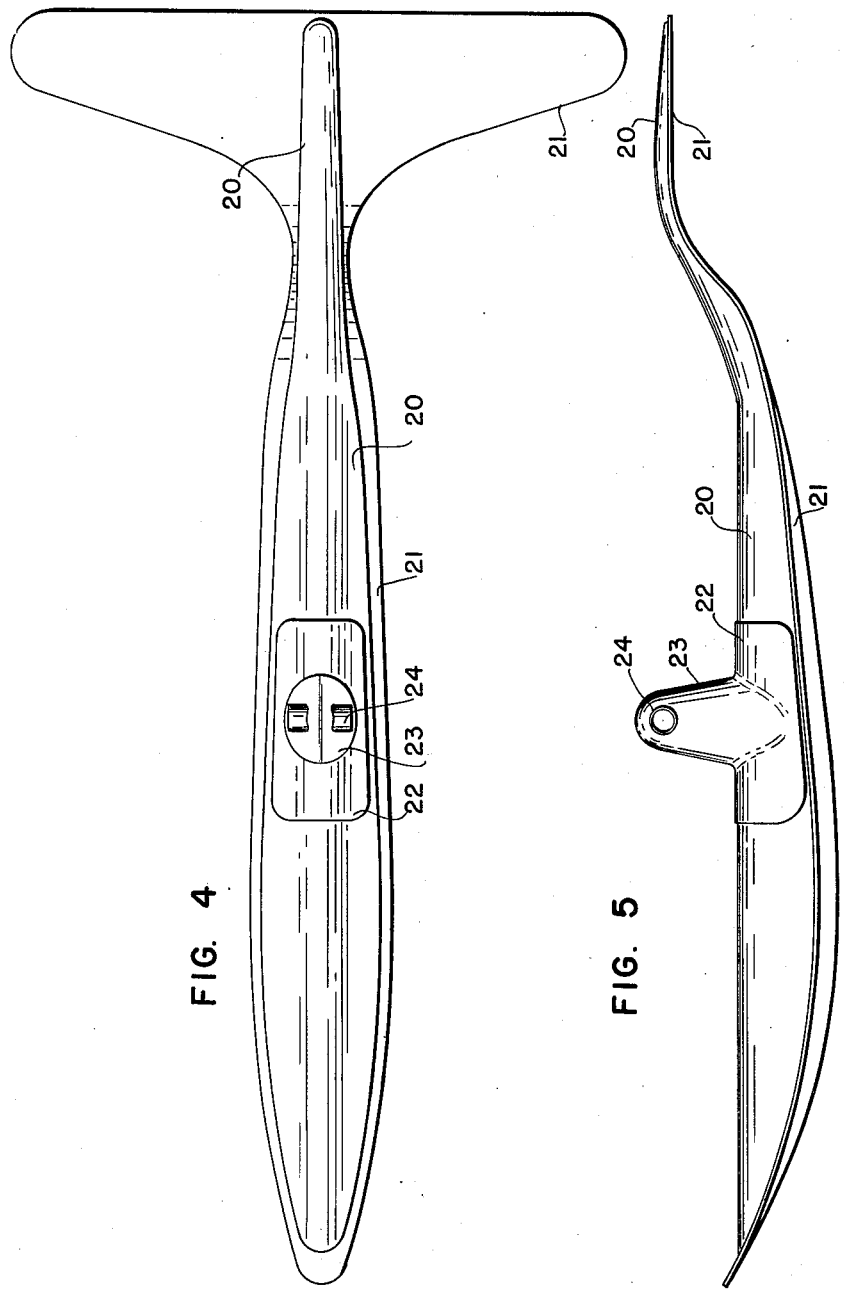
INVENTOR
FRANCIS J. DITTER
BY Anthony A. Juettner
ATTY.

Patented Jan. 13, 1953

2,625,350

UNITED STATES PATENT OFFICE 2,625,350

VANE CONTROLLED STABILIZING RIGGING FOR AIRCRAFT LANDING SKIDS

Francis J. Ditter, Minneapolis, Minn.

Application October 10, 1947, Serial No. 779,173

4 Claims. (Cl. 244—108)

The present invention relates to a rigging for aircraft landing skids and is particularly related to a rigging for aircraft skis.

Conventional aircraft skis are rotatably mounted on the wheel shaft of the conventional landing gear. For efficient operation such skis should be free for limited rotation on the wheel shaft for the purpose of adjusting the ski so that the ski will be trimmed in flight and such that it can readily adapt itself to a suitable position during the time of landing and during taxiing.

In order to accomplish these ends, it has been common to employ a combination of cable and shock cord or other mechanical means for the purpose of limiting the rotation of the ski on the wheel shaft. Customarily the toe of the ski is mounted in a somewhat elevated position by means of an elastic shock cord while a cable is ordinarily attached to the heel of the ski to limit the extent to which the shock cord can raise the nose of the ski.

This type of rigging has left much to be desired. The provision for the shock cord and the cable or the provision for other mechanical means for accomplishing the same result, has increased the drag on the ski and thus adversely affected the flight characteristics of the airplane particularly in the case of large skis, where the mechanical rigging means become cumbersome. Moreover mechanical means for accomplishing this result may get out of order and require maintenance from time to time. A further disadvantage of this type of rigging is the lack of flexibility of pitching for ground conditions. Thus where the relative movement of the ski is mechanically limited, excessive pitching of the airplane may cause the skis to rotate to the limit permitted by the cable and further pitching of the plane may put an undue stress on the nose of the ski. This may result in damage to the ski or may in severe cases result in the aircraft nosing over. A further disadvantage of this type of rigging is encountered in connection with retractable landing gear. The shock cord and cable are customarily attached to the fuselage of the airplane and of course become slack as the retractable landing gear is retracted. During retraction of the landing gear this may cause the ski to rotate freely and assume a position which is dangerous for flying and landing.

It has now been discovered that these difficulties with prior means of rigging can be overcome in a simple and efficient manner. It has been discovered that by affixing an airfoil to a ski it is possible to rig the ski in an efficient aerodynamic manner and with a minimum of wind resistance. Moreover the use of such an airfoil for rigging the ski permits complete flexibility of pitching for ground or air conditions and also serves to maintain the ski in trim during retraction of the retractable landing gear.

It is, therefore, an object of the present invention to provide an airfoil rigging for an aircraft landing skid.

It is another object of the invention to provide an airfoil rigging for an aircraft landing ski.

It is a further object of the present invention to provide an airfoil rigging for an aircraft landing ski which is mounted on retractable landing gear thus permitting the ski to be in trim during the process of retraction.

These and other objects of the invention will be more fully apparent from the following description thereof, with particular reference to the drawings in which:

Figure 1 is a perspective of an aircraft ski supported on a wheel shaft and illustrating the airfoil attached to the heel of the ski;

Fig. 2 is a plan view of an aircraft ski attached to a wheel shaft of a landing gear and illustrating how the angle of attack of the airfoil can be varied depending upon the particular position of the aircraft ski;

Fig. 3 is a side elevation of the ski shown in Fig. 2;

Fig. 4 is a plan view of an aircraft ski in which the airfoil is an integral part of the ski; and Fig. 5 is a side elevation of the ski in Fig. 4.

While the present invention is applicable to any type of ski, the drawing illustrates this application to a ski of the type disclosed and claimed in my copending application, Serial No. 706,883, filed October 31, 1946, now Patent No. 2,539,817, issued January 30, 1951. In general such a ski is composed of an inverted channel section 20 superimposed over a shoe 21 and attached thereto along the periphery of the shoe. A saddle 22 generally conformed to the shape of the inverted channel 20, serves as a means for supporting pedestal 23 onto the main portion of the ski. The pedestal 23 is provided with a bushing 24 which slides over and forms a bearing for rotation of the ski about wheel shaft 25. 26 is the ordinary shock strut of an aircraft to which the ordinary wheel shaft is customarily attached. At the heel of the ski an airfoil 27 is supported by means of strut 28, which in turn is attached to the heel of the ski by means of bracket 29 such that the chord of the airfoil 27 is positioned at an angle relative to the shoe of the ski that in normal flight the airfoil will maintain the ski at a proper angle of attack suitable for takeoff, flight, and landing. In this way the ski possesses a minimum of wind resistance during flight and is constantly maintained in a suitable position for flight and landing. Any effect of the wind on the toe portion of the ski tending to rotate the ski about the wheel shaft is corrected by the aerodynamic stability of the airfoil 27.

In Figs. 2 and 3 there is illustrated a modification of the rigging in which the angle of attack of the airfoil may be varied more rapidly than the change in the angle of attack of the ski itself. Thus it is possible to make most efficient use of the airfoil to maintain the ski at the proper angle during flight and during the landing. Any movement of the ski produces a multiplied movement of the airfoil which immediately counteracts the movement of the ski and brings it back to normal. This is accomplished regardless of whether the movement of the nose of the ski is upwardly or downwardly. This control in Figs. 2 and 3 is obtained as follows. The airfoil 31 is supported on stub support 32 to which the heel support 33 and the lever 34 are attached, these elements being pivoted on stub support 32 at points 35 and 36 respectively. Heel support 33 is fastened to the heel of the ski by means of bracket 37. The lever 34 is pivotally attached at 38 to fixed support 39, which is suitably fastened to the brake flange 40 (Fig. 2) which is fixedly mounted on the wheel shaft 25.

With reference to Fig. 2, it will be seen that the heel support 33 may be in the form of two members, each supported on the bracket 37. The lever 34 may then operate between these two supports 33. It will be seen that the lever 34 has an offset which brings it over adjacent the fixed support 39, which is fastened to the brake flange 40.

The length of the various members 32, 33, and 34 is adjusted such that the airfoil 31 is in a neutral position when the ski is in a normal position for flight or landing. The dotted lines in Fig. 3 illustrate the effect on the airfoil resulting from an elevation of the nose of the ski. It will be seen that the airfoil 31 assumes a position of efficient control by this slight movement of the toe of the ski and the effect of air currents on the airfoil is such as to return the airfoil to its normal neutral position, thus bringing the ski back to its normal flight position. Movement of the toe of the ski in the reverse direction tilts the airfoil downwardly and the air currents again tend to return the airfoil to a neutral position.

A further modification of the mechanism disclosed in Figs. 2 and 3 involves the employment of a suitable cam or other means which will limit the movement of airfoil 31 such that it will not move beyond a position of maximum lift and thus prevent the airfoil 31 from ever assuming the position of stall which might not be effective in returning the ski to its normal position.

With reference to Figs. 4 and 5, it will be seen that the shoe 21 has been extended beyond the normal heel of the ski and has been extended rearwardly and upwardly to form an airfoil as is particularly evident from Fig. 4. Likewise the inverted channel 20 has been extended rearwardly and upwardly and has been shaped to form a reinforcing member for the rear portion of the shoe. This provides a simple means of constructing a ski embodying the present invention and eliminates the necessity for separate struts, brackets, and airfoils.

It will be seen from the above description that the present invention makes possible a simple and foolproof means of rigging a ski such that it will always maintain its most efficient aerodynamic characteristics and thus reduce drag to a minimum. At the same time the ski is always in the proper position for takeoff or landing.

It will be apparent that numerous modifications of the invention are possible without departing from the spirit thereof. For example, while the airfoil has been illustrated at the rear of the ski, it may also be attached at any other position such as at or near the toe of the ski or disposed to either side of the toe or heel of the ski. However, it is preferred to have it at the rear inasmuch as that is a more out-of-the-way position. It is likewise apparent that numerous variations are possible in the type of airfoil. For example, the airfoil may be composed of a pair of airfoil sections joined together along a common edge to form a generally V-shaped airfoil. Thus the sides of the V would extend upwardly to the side and provide more adequate clearance and would be less likely to be fouled by snow when used on fields having snow to an excessive depth. At the same time, various combinations of airfoils are possible as are other means of actuating the airfoil other than that illustrated in Figs. 2 and 3. For example, for application on retractible gear it is possible to provide controls for the airfoil and thus to cause the ski to follow a desired path during retraction. Thus with some retracting means it may not be possible to permit the ski to maintain a normal flight position during retraction and the controlled airfoil may be made use of to make the ski assume the proper direction for retraction.

While the present invention has been described with particular reference to skis, it is to be understood that it is applicable to other similar landing gear which has a generally planar landing surface as distinguished from the generally round landing gear such as a landing wheel. It is, therefore, applicable to floats, runners, pontoons, as well as the caterpillar or track type of landing gear. The term "airplane skid" has been used herein and in the claims to include this general type of landing gear as distinguished from the rotary and circular landing wheel.

While various modifications of this invention have been described herein, it is to be understood that it is not limited thereto, but may be varied within the scope of the following claims.

I claim as my invention:

1. An aircraft ski having intermediate its ends means for supporting the ski on the wheel shaft of the landing gear of an aircraft, a heel support member extending rearwardly and upwardly from the heel of said ski, an airfoil supported on a stub support member, said heel support member being pivotally attached to said stub support member, and a link connecting said stub support member and a point fixed relative to the wheel shaft of the landing gear.

2. An aircraft ski having intermediate its ends means for supporting the ski on the wheel shaft of the landing gear of an aircraft, a heel support member extending rearwardly and upwardly from the heel of said ski, an airfoil supported at one end of a stub support member, said heel support member being pivotally connected to said stub support member intermediate the length of said stub support member, a link pivotally connected to the stub support member at the end opposite said airfoil, said link being pivotally connected to a point fixed relative to said wheel shaft.

3. An aircraft ski having intermediate its ends means for supporting the ski on the wheel shaft of the landing gear of an aircraft, said ski being composed of a curved base shoe and an inverted channel member secured to said base shoe, said curved base shoe extending rearwardly and upwardly from the rear end thereof and terminating in an airfoil surface, and said inverted channel member extending rearwardly and upwardly along said base shoe and reinforcing said base shoe.

4. An aircraft ski having an elongated landing surface, means intermediate the ends of said ski for supporting the ski on the wheel shaft of an aircraft, said ski being composed of a curved base shoe and an inverted channel member secured to said base shoe, a support extending rearwardly and upwardly from the heel of said ski, an airfoil attached to said support, said airfoil having a surface which is generally parallel to the landing surface and adapted to rig the ski for its normal position in flight.

FRANCIS J. DITTER.

REFERENCES CITED

The following references are of record in the file of this patent:

UNITED STATES PATENTS

| Number | Name | Date |
|---|---|---|
| 1,083,464 | Roche | Jan. 6, 1914 |
| 1,786,472 | Yates | Dec. 30, 1930 |
| 2,302,343 | Noorduyn | Nov. 17, 1942 |
| 2,353,962 | Koppen | July 18, 1944 |

FOREIGN PATENTS

| Number | Country | Date |
|---|---|---|
| 125,123 | Great Britain | Apr. 17, 1919 |
| 151,153 | Great Britain | Sept. 23, 1920 |
| 394,423 | Germany | July 29, 1924 |
| 48,101 | France | July 13, 1937 |
| | (Addition to 818,841) | |